(12) United States Patent
Sharb

(10) Patent No.: US 6,821,415 B2
(45) Date of Patent: Nov. 23, 2004

(54) SELF-ADJUSTING FLUID SURFACE SKIMMER AND FLUID TREATMENT SYSTEM USING SAME

(76) Inventor: Matthew L. Sharb, 616 Laurel Ave., Port Clinton, OH (US) 43452

(*) Notice: Subject to any disclaimer, the term of this patent is extended or adjusted under 35 U.S.C. 154(b) by 57 days.

(21) Appl. No.: 10/075,076

(22) Filed: Feb. 13, 2002

(65) Prior Publication Data

US 2003/0150788 A1 Aug. 14, 2003

(51) Int. Cl.[7] .................................................. C02F 3/12
(52) U.S. Cl. ..................... 210/122; 210/195.3; 210/197; 210/242.1; 210/256; 210/540
(58) Field of Search ............................. 210/122, 195.1, 210/195.3, 126.4, 197, 220, 242.1, 28, 258, 540

(56) References Cited

U.S. PATENT DOCUMENTS

| | | | | |
|---|---|---|---|---|
| 836,335 A | * | 11/1906 | Nichols | 210/242.1 |
| 3,043,433 A | * | 7/1962 | Singer | 210/197 |
| 3,339,741 A | * | 9/1967 | Bernard et al. | 210/195.4 |
| 4,093,549 A | * | 6/1978 | Wilson | 210/197 |
| 4,211,657 A | * | 7/1980 | Etlin | 210/195.4 |
| 4,265,753 A | | 5/1981 | Manuel | |
| 4,536,286 A | | 8/1985 | Nugent | |
| 5,196,114 A | * | 3/1993 | Burwell | 210/197 |
| 5,217,609 A | * | 6/1993 | Holdeman | 210/220 |
| 5,221,470 A | | 6/1993 | McKinney | |
| 5,358,644 A | * | 10/1994 | Dennis | 210/242.1 |
| 5,421,995 A | * | 6/1995 | Norcross | 210/242.1 |
| 5,454,942 A | | 10/1995 | Ljungberg | |
| 5,549,817 A | * | 8/1996 | Horsley et al. | 210/540 |
| 5,573,670 A | | 11/1996 | Nagasaki et al. | |
| 5,593,574 A | | 1/1997 | VanToever | |
| 5,688,400 A | * | 11/1997 | Baxter, Sr. | 210/195.3 |
| 5,720,885 A | | 2/1998 | Moos | |
| 5,820,751 A | * | 10/1998 | Faircloth, Jr. | 210/122 |
| 5,954,953 A | | 9/1999 | Guy et al. | |
| 5,961,826 A | | 10/1999 | Kim | |

* cited by examiner

Primary Examiner—Christopher Upton
(74) Attorney, Agent, or Firm—Fraser Martin Buchanan Miller LLC; J. Matthew Buchanan

(57) ABSTRACT

A self-adjusting fluid surface skimmer and a wastewater treatment system incorporating the same are provided. In one embodiment, the skimmer includes an intake passage and an outlet passage. The intake passage comprises first and second passageways connected by a flexible coupling. A collar is positioned around the first passageway near an intake opening. At least one buoyant member is attached to the collar and facilitates self-adjustment of the skimmer. A gas inlet is disposed in the outlet passage and allows for the movement of gas through the outlet passage, which creates a suction effect in the intake passage. The wastewater treatment system comprises an aeration tank disposed in a settling tank such that a clearance is created between the two tanks. A skimmer according to the present invention is disposed within the clearance. The skimmer enables further removal of solids from treated fluid within the settling tank prior to leaving the treatment system.

14 Claims, 6 Drawing Sheets

SELF-ADJUSTING FLUID SURFACE SKIMMER AND FLUID TREATMENT SYSTEM USING SAME

FIELD OF THE INVENTION

The present invention relates to devices and systems for the treatment of raw fluid containing various types of contaminants. More specifically, the invention relates to devices and systems for use in wastewater treatment methods that include aeration and settling phases.

BACKGROUND OF THE INVENTION

Purification of fluids, such as wastewater, is often accomplished in a treatment system that utilizes two separate phases: aeration and settling phases. In the aeration phase, a gas, such as air or oxygen, is passed through the raw fluid to allow biological elements, such as bacteria, to act on the fluid matter contained therein. Following the aeration phase, the fluid enters a settling phase where sludge is allowed to settle out of the fluid. Also during the settling phase, remaining solid matter may rise to the surface as a floatation scum or sludge. This is typically removed by suction or mechanical means.

In conventional wastewater treatment systems, the sludge is typically removed by mechanical action on the water. For example, U.S. Pat. No. 5,454,942 to Ljungberg describes a reciprocating carriage apparatus that utilizes skimmer blades to mechanically force sludge from the surface of a treated fluid into a receptacle for subsequent removal. The various prior art devices, including the carriage device mentioned above, are not desirable because they typically contain moving elements that may be affected by exposure to sludge.

Another defect of the prior art is that conventional fluid treatment systems frequently rely only on gravity and a mechanical apparatus to remove sludge from treated fluid. This sometimes proves inadequate, and treated fluid can leave a treatment system with residual solids.

As a result of these and other defects of the prior art, there is a need for a skimmer device that enables simple and efficient removal of solid matter, such as sludge from treated fluids. Further, there is a need for a fluid treatment system that includes such a skimmer, as well as other structural elements that facilitate the removal of solid matter from treated fluid.

SUMMARY OF THE INVENTION

The present invention provides a fluid surface skimmer device and a fluid treatment system that utilizes the skimmer device. When used in a treatment system, the skimmer provides a further opportunity to remove solid material from the treated fluid.

The skimmer has self-adjusting properties that allow for optimum orientation of the skimmer no matter the orientation of the overall system. For example, if the tanks of a treatment system are installed such that they are not level, the skimmer adjusts its orientation to ensure proper alignment with the fluid surface within the treatment system. This allows the skimmer and treatment system to operate effectively in situations in which conventional devices and systems cannot.

In one embodiment, the skimmer comprises intake and outlet passages. The intake passage has a first passageway which defines an intake opening and a second passageway in fluid communication with the outlet passage. A flexible coupling connects the first and second passageways. Together, the first passageway, flexible coupling, and second passageway define a conduit that comprises the intake passage.

A collar is disposed on an exterior surface of the first passageway near the intake opening. Also, at least one buoyant member is attached to the collar. The flexible coupling allows for lateral and vertical movement of the first passageway relative to the second passageway, thereby allowing the skimmer to self-adjust by placing the intake opening of the first passageway at or near the fluid level.

The present invention also provides an improved fluid treatment system. The system is compact and efficient making it ideal for wastewater treatment applications, such as residential and agricultural wastewater treatment. The structural elements of the treatment system provide multiple opportunities to encourage settling of solid material out of the treated fluid. In a preferred embodiment, the system comprises a settling tank defining a first interior chamber and an aeration tank disposed within the first interior chamber. The aeration tank defines a second interior chamber. A base is disposed below the aeration tank and defines a communicative passageway between the first and second interior chambers.

A clearance exists between the exterior surface of the aeration tank and the interior surface of the settling tank. A plurality of vertically oriented brackets are disposed in the clearance and connect the aeration and settling tanks. The brackets provide a baffle that encourages further settling of solid matter out of the fluid.

A raw fluid inlet provides fluid access to the second interior chamber, i.e. the aeration tank, and a treated fluid outlet provides egress from the first interior chamber, i.e., the settling tank. A fluid surface skimmer according to the present invention is disposed in the clearance between the aeration and settling tanks. The intake passageway of the skimmer is disposed in the clearance and the outlet passageway is in communication with the second interior chamber. In this configuration, the skimmer removes fluid from the surface of the fluid in the clearance and returns the removed fluid to the aeration tank. Since the removed fluid is concentrated at the surface prior to removal by the skimmer, it is likely to contain flotation sludge if any is present. Accordingly, the skimmer acts to return flotation sludge to the aeration tank for further treatment by the system.

Preferably, a gas supply line has a first portion that extends into the second interior chamber and a second portion attached to a gas inlet of the skimmer. This allows a single gas supply line to drive the aeration and the skimmer.

While the invention is defined by the claims appended hereto, additional understanding of the invention can be obtained by referencing the following detailed description of preferred embodiments and the appended drawings.

DETAILED DESCRIPTION OF PREFERRED EMBODIMENTS OF THE PRESENT INVENTION

The following description of preferred embodiments provide examples of the present invention. The embodiments discussed herein are merely exemplary in nature, and are not intended to limit the scope of the invention in any manner. Rather, the description of these preferred embodiments and methods serves to enable a person of ordinary skill in the relevant art to make, use and perform the present invention.

Figure 3:
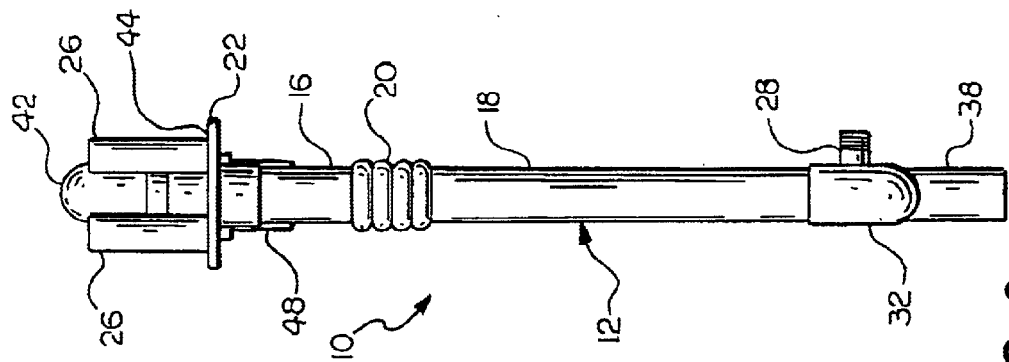
FIG. 3 is an end view of the skimmer device illustrated in FIG. 1.
Figure 2:
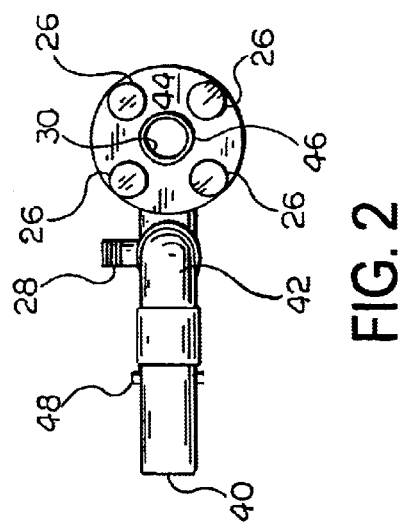
FIG. 2 is a top view of the skimmer device illustrated in FIG. 1.
Figure 1:
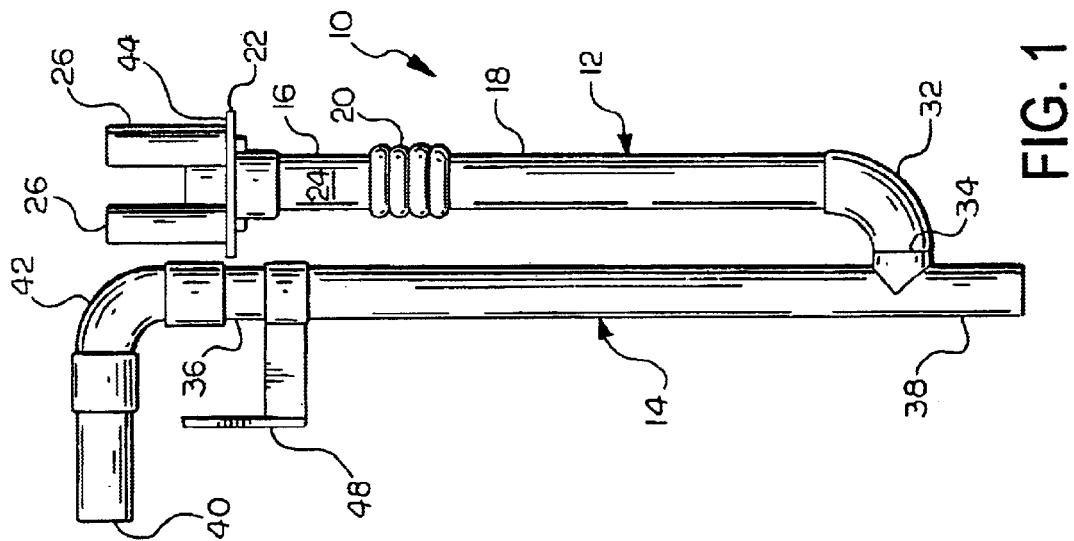
FIG. 1 is an elevational view of a fluid surface skimmer device according to a preferred embodiment of the present invention.

FIGS. 1 through 3 illustrate a surface skimmer 10 according to a preferred embodiment of the present invention. As best illustrated in FIG. 1, the skimmer 10 has an intake assembly 12 and an outlet passage 14. The intake assembly 12 comprises a conduit that provides fluid access to the outlet passage 14. Preferably, the intake assembly 12 has first 16 and second 18 sections that define passageways. A flexible coupling 20 connects the first 16 and second 18 sections. A collar 22 is disposed on an exterior surface 24 of the first section 16. At least one buoyant vessel 26 is attached to the collar 22. As shown in FIGS. 2 and 3, the skimmer 10 also includes a gas inlet 28.

The intake assembly 12 is a conduit that defines an internal passageway extending through the first section 16, the flexible coupling 20 and the second section 18. As illustrated in FIG. 2, the first section 16 defines an intake opening 30 that provides fluid communication between the conduit of the intake assembly 12 and the external environment.

The first 16 and second 18 sections preferably comprise conventional tubular structures, such as standard PVC piping or other synthetic tubing material. Also preferable, as illustrated in the Figures, the first 16 and second 18 sections preferably share a common outer diameter. Also preferable, the sections 16, 18 have a common internal diameter. This facilitates even flow of fluid through the intake assembly 12.

As will be developed more fully below, the first section 16 is able to move relative to the second section 18 due to the flexible coupling 20. This movement provides the skimmer 10 with self-adjusting properties. The relative length of the first section 16 as compared to the second section 18 can be optimized based upon the amount of vertical movement desired. Preferably, the first section 16 has a length that is considerably shorter than that of the second section 18. Particularly preferable, the first section 16 is between approximately ⅕ and ⅓ of the length of the second section 18.

As best illustrated in FIG. 1, the first section 16 is preferably linear along its length. In contrast, the second section 18 preferably defines an elbow 32 or other non-linear region that facilitates connection of intake assembly 12 to the outlet passage 14.

Flexible coupling 20 is a flexible member that attaches to both the first 16 and second 18 sections of the intake assembly 12. Preferably, the flexible coupling 20 is a cylindrical member defining an interior passageway that extends the interior passageways of the first 16 and second 18 sections. The coupling 20 enables the first section 16 to move relative to the second section 18. Preferably, the coupling allows the first section 16 to pivot about a point within the coupling 20 relative to the second section 18. Particularly preferably, this movement can occur in all directions away from a central point within the flexible coupling 20. Also, the coupling 20 preferably allows vertical movement of the first section 16 relative to the second section 18.

As best illustrated in FIGS. 1 and 3, the flexible coupling 20 preferably comprises a segmented flexible member known to those skilled in the art. The segments expand to allow the pivoting and vertical movement of the first section 16. Also preferable, the flexible coupling 20 is attached to the first 16 and second 18 sections. Preferably, the attachment is accomplished by a fluid tight connection between the coupling 20 and the first 16 and second 18 sections. These connections can be accomplished by use of adhesives, mechanical retaining members, and the like.

The outlet passage 14 also defines an opening 34 that is in fluid communication with the second section 18 of the intake assembly 12. Preferably, as illustrated in FIG. 1, the opening 34 is connected to the elbow 32 of the intake assembly 12. The outlet passage 14 has upper 36 and lower 38 ends. The upper end 36 defines a return outlet 40. Preferably, as best illustrated in FIG. 1, the return outlet 40 includes an elbow region 42 that confers an orthogonal orientation onto the return outlet 40. Also preferable, the outlet passage 14 has a length sufficient to place the return outlet 40 above the intake opening 30 of the intake assembly 12.

Similar to the intake assembly 12, the outlet passage 14 preferably comprises a conventional tubular structure known to those skilled in the art, such as PVC piping. The inner diameter of the outlet passage 14 can be optimized based upon the flow requirements of the skimmer 10. Of course, any suitable diameter can be used based upon the application of the skimmer 10.

The gas inlet 28 defines a passageway that provides fluid communication from the external environment to the interior passageway of the outlet passage 14. Also, the gas inlet 28 preferably defines a structural feature on the exterior outlet passage 14 to which a gas supply line can be connected. Accordingly, the gas inlet can be any conventional inlet connector suitable for attaching tubing or piping. The gas inlet 28 can be integrally formed with the outlet passage 14, or can comprise a separately attached member.

The gas inlet 28 can be positioned at any point along the length of the outlet passage 14. The gas inlet allows a gas to be introduced into the interior passageway of the outlet passage 14. In operation, gas entering the outlet passage 14 through the gas inlet 28 bubbles through the interior passageway of the outlet passage 14 to the return outlet 40 when the skimmer 10 is properly oriented, i.e., the upper end 36 of the outlet passage 14 is vertically higher than the lower end 38. This bubbling of gas through the outlet passage 14 creates a suction effect, drawing fluid into the intake opening 30 and through the intake assembly 12. To optimize the suction effect, the gas inlet 28 is preferably disposed between the upper end 36 of the outlet passage 14 and the opening 34 in the lower end 38 of the outlet passage 14. Preferably, however, as best illustrated in FIG. 3, the gas inlet 28 is positioned on the outlet passage 14 at a point above the opening 34 of the outlet passage 14. That is, the inlet 28 is preferably positioned just above the point at which the outlet passage 14 is connected to the intake assembly 12.

The collar 22 provides an attachment surface 44 onto which at least one buoyant vessel 26 can be attached. As best illustrated in FIG. 2, the collar preferably defines a circumferential opening 46 that receives the outer diameter of the first section 16 of the intake assembly 12. The circumferential opening 46 allows fluid access to the intake opening 30 of the first section 16. Also preferable, the collar 22 is disposed circumferentially around the first section 16.

The collar 22 is preferably secured to an exterior surface 24 of the first section 16. The attachment between the collar 22 and the first section 16 can comprise any suitable connection between the members, including a frictional fit between the members, an adhesive connection, and a connection utilizing a connector, such as a rivet and the like. As the collar 22 is advantageously formed of a synthetic material, any suitable means for attaching synthetic materials to each other can be utilized. Preferably, an adhesive forms a connection between the collar 22 and the first section 16. As with all connections between structural members of the skimmer 10, the connection between the collar 22 and the first section 16 is preferably liquid tight.

At least one buoyant member 26 is disposed on the attachment surface 44 of the collar 22. The buoyant member 26 provides buoyancy to the collar 22 and, in turn, the attached first section 16. This buoyancy causes the first section 16 to move relative to the second section 18 when the intake opening 30 is positioned somewhat below a fluid level, such as when the skimmer 10 is disposed in a fluid treatment system. Thus, the buoyant member 26, in conjunction with flexible coupling 20, provides one of the self-adjusting features of the skimmer 10.

Preferably, the buoyant member 26 comprises a sealed vessel containing a quantity of air. However, other buoyant members, such as sections of foam, can be utilized as the buoyant member 26. The size, configuration, and number of buoyant members 26 utilized can be optimized based upon various parameters, including the specific gravity of the first section 16 in a particular fluid. The buoyant members need only be able to provide the desired buoyancy to the collar 22 and first section 16. As best illustrated in FIG. 2, a configuration of four buoyant members 26, spaced equidistantly about the intake opening 30, has been found acceptable for use in a wastewater treatment system according to the present invention.

The skimmer 10 may further include a mounting bracket 48. The mounting bracket 48 facilitates attachment of the skimmer 10 to a structure, such as a tank in a fluid treatment system. Preferably, as best illustrated in FIG. 1, the mounting bracket 48 is attached to the outlet passage 14.

Figure 4:
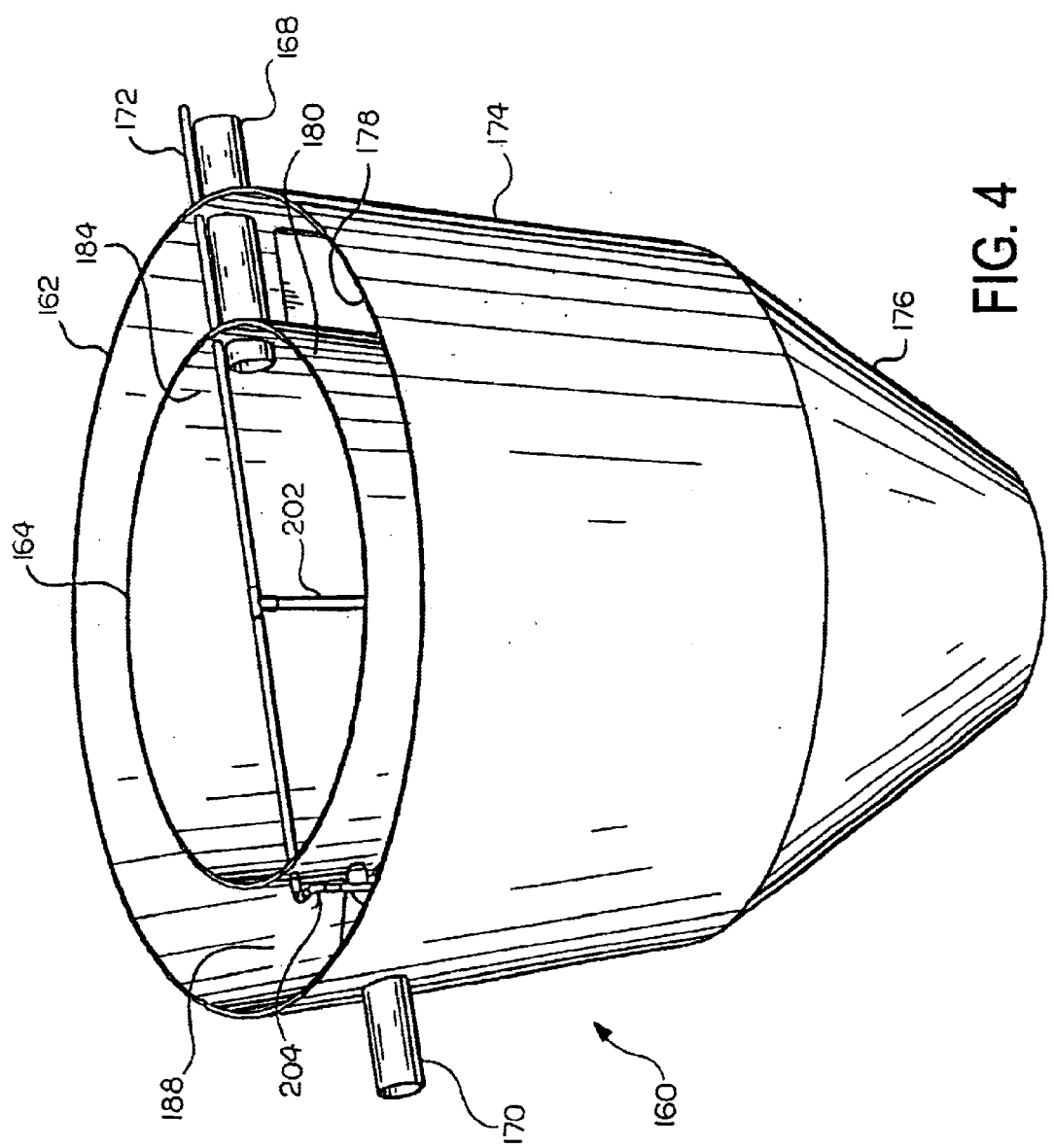
FIG. 4 is a peripheral view of a fluid treatment system according to a first preferred embodiment of the present invention.
Figure 5:
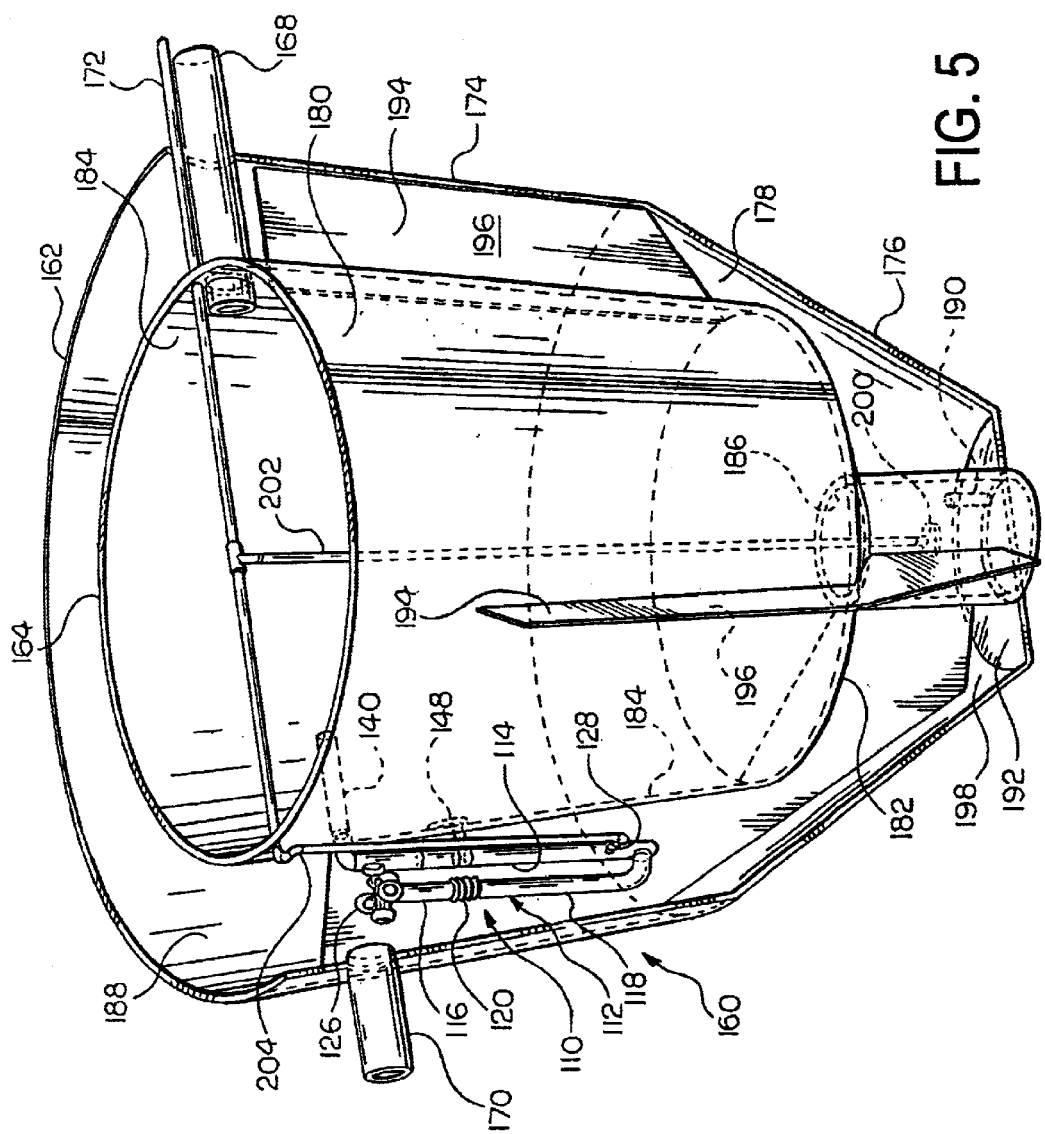
FIG. 5 is a partial cross-sectional view of the fluid treatment system illustrated in FIG. 1.

The present invention also provides a fluid treatment system. FIGS. 4 and 5 illustrate a wastewater system 160 according to a first preferred embodiment of the present invention. The system includes a settling tank 162, an aeration tank 164, and a base 166 disposed below the aeration tank 164. Also, the system 160 includes a raw fluid inlet 168, a treated fluid outlet 170, a gas supply line 172, and a fluid surface skimmer 110 according to the present invention.

The settling tank 162 has an upper portion 174 and a lower portion 176. Preferably, the upper portion 174 is substantially cylindrical in form, while the lower portion 176 is preferably conical in form. The upper portion 174 may define a tapered surface that gives the upper portion 174 a gradually reducing diameter from its top to its bottom. This taper facilitates settling of solid material from fluid within the settling tank 162. The bottom of the settling tank 162 is preferably closed, as best illustrated in FIG. 5.

The settling tank 162 defines an interior chamber 178. The aeration tank 164 is disposed within the interior chamber 178.

The aeration tank 164 also has an upper portion 180 and a lower portion 182. Also, the aeration tank 164 defines a second interior chamber 184. Preferably, as illustrated in FIGS. 4 and 5, the aeration tank 164 has a configuration similar to that of the settling tank 162. Thus, as best illustrated in FIG. 5, the upper portion 180 of the aeration tank 164 is preferably substantial cylindrical, and the lower portion 182 is preferably conical in shape. As with the settling tank 162, the upper portion 180 of the aeration tank 164 may gradually taper from a larger diameter at its top to a smaller diameter at its bottom. In contrast to the settling tank 162, however, the lower portion 182 of the aeration tank 164 defines an opening 186.

The aeration tank 164 is disposed in the interior chamber 178 of the settling tank 162 to define a clearance 188 between an exterior surface of the aeration tank 164 and an interior surface of the settling tank 162. The clearance 188 defines a region in which the settling phase of a treatment operation utilizing the system 166 occurs.

As best illustrated in FIG. 5, the base 166 is positioned below the aeration tank 164 and defines a passageway between the interior chamber 178 of the settling tank 162 and the interior chamber 184 of the aeration tank 164. Preferably, the passageway of the base 166 communicates with the opening 186 in the lower portion 182 of the aeration tank 164. Also preferable, as illustrated in FIG. 5, the base 166 defines a notch 190 that, together with a bottom surface 192 of the settling tank 162, defines an opening into the passageway of the base 166. Particularly preferable, the notch 190 extends along only a fraction of the circumference of the base 166.

At least one bracket 194 is disposed in the clearance 188 and connects the exterior surface of the aeration tank 164 to the interior surface of the settling tank 162. Preferably, as illustrated in FIG. 5, multiple brackets 194 are disposed in the clearance 188.

The clearance 188 defines a region in the system 160 in which the settling phase of a treatment procedure occurs. By being positioned in the clearance 188, the brackets provide multiple surfaces 196 that can act to promote a quiescent nature of the fluid in the clearance 188 thereby facilitating settling of solid materials in the fluid contained in this region. To facilitate this baffling function of the brackets 194, the brackets 194 are preferably arranged equidistantly from each other. Also, as illustrated in FIG. 5, the brackets 194 preferably extend below the aeration tank 164 and substantially along the length of the base 166. A gap 198 exists between the bottom of each bracket 194 and the bottom surface 192 of the settling tank 162. This gap 198 provides a path by which fluid can travel into the several cells defined in the clearance 188 by the brackets 194. The brackets 194 are preferably arranged equidistantly from each other.

The raw fluid inlet 168 provides fluid access to the interior chamber 184 of the aeration tank 164 from an external fluid source, such as a wastewater output. To maintain a compact design, the fluid inlet 168 preferably traverses the wall of the settling tank 162, passes through the clearance 188, and traverses the wall of the aeration tank 164. The inlet 168 then terminates in the interior chamber 184 of the aeration tank 164.

Similar to the raw fluid inlet 168, the treated fluid outlet 170 defines a passageway between the clearance 188 and the external environment. As used in treatment system 160, the treated fluid outlet 170 can lead to further treatment equipment, such as chlorination tanks, or to final effluent disposal. The treated fluid outlet 170 is preferably vertically positioned below inlet 168 to ensure gravity flow through the system 160. Also preferable, the treated fluid outlet 170 comprises a passageway that traverses the wall of the settling tank 162.

As illustrated in FIG. 5, the fluid surface skimmer 110 is preferably a skimmer according to the preferred embodiment of the present invention, as detailed above. The skimmer 110 is positioned within the clearance 188 between the settling 162 and aeration 164 tanks. Preferably, the skimmer 110 is positioned such that the return outlet 140 extends through the wall of the aeration tank, leading back into the interior chamber 184 of the aeration tank 164. Also preferable, the intake opening 130 is positioned slightly below the opening of the treated fluid outlet 170. Also, the skimmer 110 is preferably attached to the aeration tank 164 by the mounting bracket 148.

As best illustrated in FIG. 5, the gas supply line 172 preferably extends into the interior chamber 184 of the aeration tank 164. Particularly preferable, the gas supply line 172 extends through the interior chamber 184 and into the passageway defined by the base 166. Also, a gas diffuser 200 is preferably disposed on the gas supply line 172 within the base 166. The gas diffuser 200 can be any suitable conventional gas diffuser, such as a disk-shaped member defining a plurality of openings through which gas can exit the gas supply line 172.

In operation of the system 160, gas travels through the gas supply line 172 and exits through the diffuser 200. The exiting gas then bubbles through the fluid contained within the interior chamber 184 of the aeration tank 164, thereby facilitating the aeration phase of the treatment process.

As discussed above, the skimmer 110 contains a gas inlet 128 and is advantageously operated by allowing gas to travel through the outlet passage 114. Accordingly, to maintain efficiency of the system 160, the gas supply line 172 preferably has a first portion 202 that extends into the interior chamber 184 of the aeration tank 164, and a second portion 204 that is connected to the gas inlet 128 of the skimmer 110.

Figure 6:
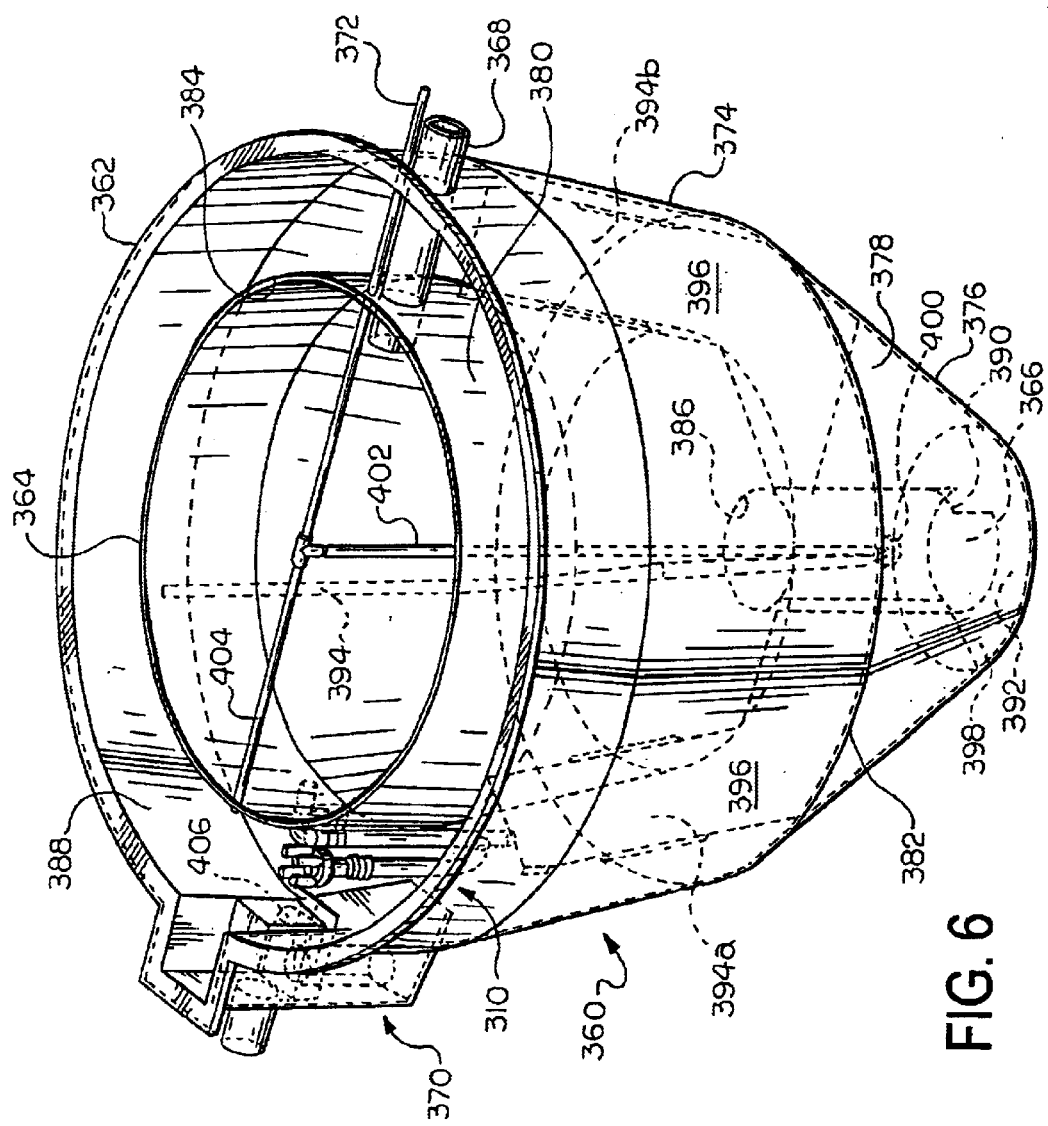
FIG. 6 is a peripheral view of a fluid treatment system according to a second preferred embodiment of the present invention.

FIG. 6 illustrates a second preferred embodiment of the fluid treatment system 360 of the present invention. This embodiment is similar to the first preferred embodiment, except as detailed below. Accordingly, like reference numbers in FIG. 6 refer to similar features and/or components illustrated in FIGS. 4 and 5.

In this embodiment, two types of brackets are utilized. A first bracket 394a extends below the aeration tank and substantially along the length of the base 366. The second bracket 394b extends below the aeration tank 364 and along only a fraction of the length of the base 366. This bracket 394b is preferably positioned above the notch 390 in the base 366. This arrangement of brackets facilitates movement of fluid from the interior chamber 384 of the aeration tank 364 through the base 366 and into the clearance 388. As illustrated in FIG. 6, the notch 390 is preferably positioned opposite the outlet 370 of the system 360. Also, bracket 394a is preferably positioned between notch 390 and outlet 370, thereby ensuring that most fluid encounters at least bracket 394b. This arrangement of the notch 390, outlet 370, and brackets 394a, 394b ensures that solids in the fluid within the system 360 have ample opportunity to settle. Allowing a substantial amount of fluid to flow directly from notch 390 to outlet 370 would eliminate some of the settling opportunity, which is undesirable.

Figure 7:
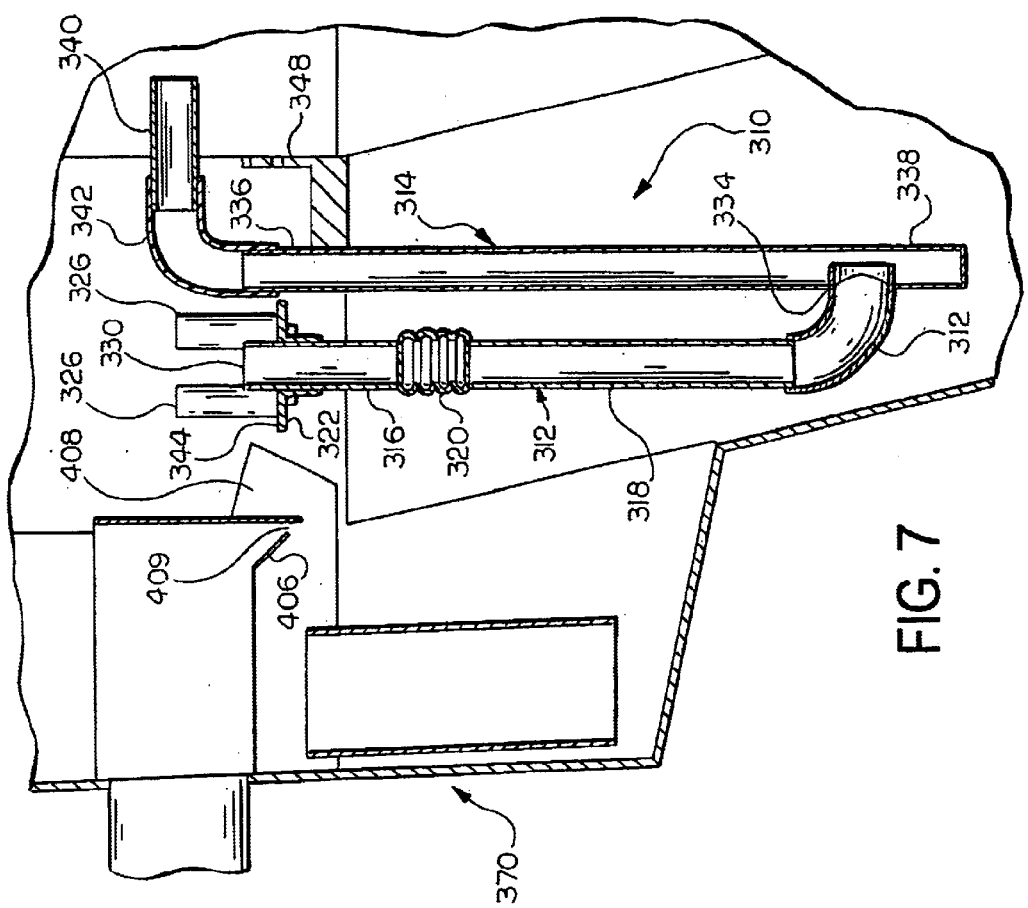
FIG. 7 is a magnified elevational view of the fluid surface skimmer and treated fluid outlet of the fluid treatment system illustrated in FIG. 6.

Also in this embodiment, as best illustrated in FIG. 7, the treated fluid outlet 370 comprises a tortuous path defined by at least one baffle 406. The baffle 406 is positioned to redirect flow of fluid through the outlet along a series of turns. Also, the treated fluid outlet 370 preferably includes a recycle passageway 408 as its positioned to direct flow of a portion of the treated wastewater toward the skimmer 310. This facilitates return of fluid still containing solids towards the intake opening 330 of the skimmer 310, thereby increasing the effectiveness of the treatment system 360 and removing solids from the fluid. Further, the outlet 370 may include means for filtering solids, such as a mesh covering or other suitable approaches to filtration known in the art.

To further encourage settling, the clearance 388 is advantageously made wider near the top of the system 360. This can be accomplished by making the walls of the aeration 364 and settling 362 tanks non-parallel to each other such that the clearance 388 widens as it proceeds toward the top of the system 360. The wall of the aeration tank 364 can be angled inward, or the wall of the settling tank 362 can be angled outward. Also, both walls could be angled in these manners. Preferably, as illustrated in FIG. 6, the wall of the aeration 364 tank is directed inward.

FIG. 7 illustrates a magnified view of the outlet 370 and skimmer 310. Fluid traveling through the outlet 370 encounters baffle 406. The momentum of solid particles in the fluid at this point forces them toward the recycle passageway 408, while fluid not containing solids travels through exit passageway 409 and out of the treatment system. The recycle passageway 408 is directed at the intake opening 330 of the skimmer 310. This allows the outlet 370 to provide an additional solid removal step, thereby increasing the effectiveness of the fluid treatment system.

Figure 8:
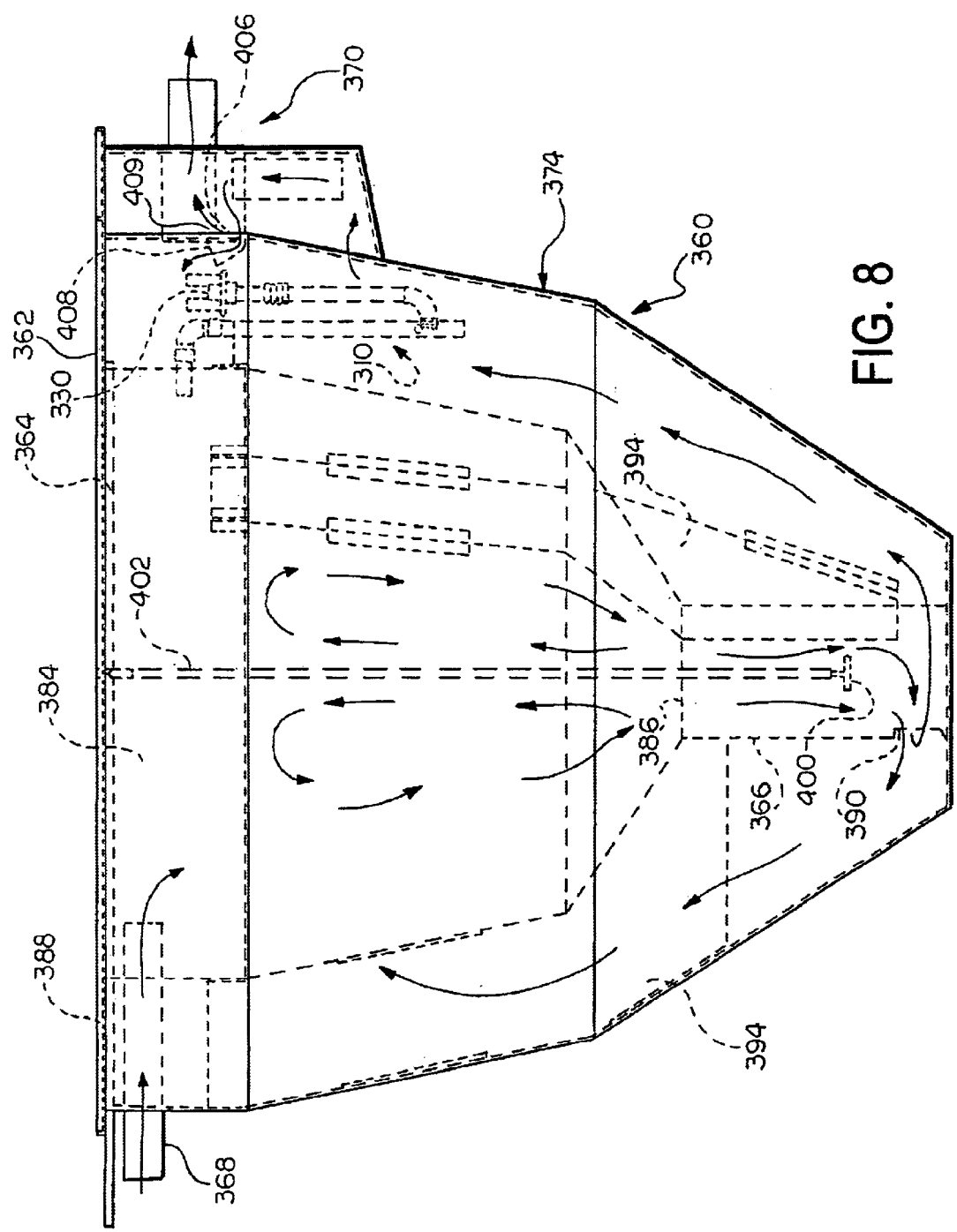
FIG. 8 is a cross-sectional view of a fluid treatment system according to the second preferred embodiment of the present invention. Arrows indicate flow of fluid in the system.

FIG. 8 illustrates the movement of fluid through a treatment system 360 according to the second preferred embodiment of the invention. Fluid enters the system through raw fluid inlet 368 and moves into the interior chamber 384 of the aeration tank 364, thereby encouraging mixing of the fluid. Gas bubbles from the diffuser 200 encourages some fluid to re-circulate through the aeration tank 364, thereby encouraging mixing of the fluid. Some fluid travels through the opening 386, into the base 366, and into the clearance 388 between the settling 362 and aeration 364 tanks. Here, fluid moves gradually upward, encountering brackets 394. Some solid matter settles out at this time. Eventually, fluid enters the treated fluid outlet 370. The angled baffle 406 encourages fluid still containing solids to flow toward the intake opening 330 of the skimmer 310 via recycle passageway 408. The skimmer 310 eventually returns this fluid to the aeration tank 364 for additional treatment. Fluid not containing solid matter is able to leave the system 360 via exit passageway 409.

The foregoing disclosure includes the best mode devised by the inventor for practicing the invention. It is apparent, however, that several variations in the present invention may be conceivable by one skilled in the art. Inasmuch as the foregoing disclosure is intended to enable one skilled in the pertinent art to practice the instant invention, it should not be construed to be limited thereby, but should be construed to include such aforementioned variations.

I claim:

1. A self-adjusting fluid surface skimmer, comprising:
   an intake assembly defining an intake passageway, the assembly comprising a first section having an exterior surface and defining an intake opening, a second section, and a flexible coupling connecting the first and second sections;
   a collar disposed on the exterior surface of the first section near the intake opening;
   at least one buoyant member attached to the collar;
   an outlet passage having upper and lower ends, the lower end defining an opening in fluid communication with the second section of the intake assembly; and
   a gas inlet disposed in the outlet passage.

2. The self-adjusting fluid surface skimmer in accordance with claim 1, wherein the collar defines a circumferential opening and the collar is disposed around the first section.

3. The self-adjusting fluid surface skimmer in accordance with claim 1, wherein the flexible coupling enables pivoting and vertical movement of the first section relative to the second section.

4. The self-adjusting fluid surface skimmer in accordance with claim 1, wherein the at least one buoyant member comprises a plurality of equidistantly spaced buoyant members.

5. The self-adjusting fluid surface skimmer in accordance with claim 1, wherein the gas inlet is disposed between the upper end and the opening in the lower end of the outlet passage.

6. The self-adjusting fluid surface skimmer in accordance with claim 1, wherein the upper end of the outlet passage defines an angled return outlet.

7. The self-adjusting fluid surface skimmer in accordance with claim 1, further comprising a mounting bracket attached to the outlet passage and adapted to secure said skimmer to a tank in a fluid treatment apparatus.

8. A wastewater treatment system, comprising:
- a settling tank comprising a first upper portion and a first lower portion, and defining a first interior chamber;
- an aeration tank disposed within the first interior chamber to define a clearance between the aeration and settling tanks, the aeration tank comprising a second upper portion and a second lower portion, and defining a second interior chamber;
- a base disposed in the first interior chamber and below the aeration tank, the base having a length extending from the settling tank to the aeration tank and defining a communicative passageway between the first and second interior chambers;
- a raw fluid inlet providing fluid communication with the second interior chamber;
- a fluid surface skimmer disposed in the clearance, the skimmer defining a return passageway providing fluid communication between the first and second interior chambers; and
- a treated fluid outlet in communication with the first interior chamber;
- at least one bracket disposed in the clearance and connecting the aeration and settling tanks;
- wherein the at least one bracket comprises first and second brackets, the first bracket extending below the aeration tank and substantially along the length of the base and the second bracket extending below the aeration tank and along only a fraction of the length of the base.

9. The wastewater treatment system in accordance with claim 8, wherein the second bracket is attached to the base above the communicative passageway.

10. The wastewater treatment system in accordance with claim 8, further comprising a baffle disposed in the treated fluid outlet.

11. The wastewater treatment system in accordance with claim 10, wherein the treated fluid outlet further comprises a recycle passageway in communication with the first interior chamber and positioned to direct flow of said wastewater toward the skimmer.

12. The wastewater treatment system in accordance with claim 8, wherein first and second sections of the first and second upper portions diverge to increase the clearance.

13. A wastewater treatment system, comprising:
- a settling tank comprising a first upper portion and a first lower portion, and defining a first interior chamber;
- an aeration tank disposed within the first interior chamber to define a clearance between the aeration and settling tanks, the aeration tank comprising a second upper portion and a second lower portion, and defining a second interior chamber;
- a base disposed in the first interior chamber and below the aeration tank, the base having a length extending from the settling tank to the aeration tank and defining a communicative passageway between the first and second interior chambers;
- a raw fluid inlet providing fluid communication with the second interior chamber;
- a fluid surface skimmer disposed in the clearance, the skimmer defining a return passageway providing fluid communication between the first and second interior chambers; and
- a treated fluid outlet in communication with the first interior chamber;
- wherein the skimmer comprises an intake assembly defining an intake passageway and having an opening in communication with the first interior chamber, and first and second sections connected by a flexible coupling, an outlet passage in communication with the intake passageway and the second interior chamber, a collar disposed adjacent the opening, and at least one buoyant member attached to the collar.

14. A wastewater treatment system, comprising:
- a settling tank comprising a first upper portion, a first lower portion, and defining a first interior chamber;
- an aeration tank disposed within the first interior chamber to define a clearance between the aeration and settling tanks, the aeration tank comprising a second upper portion and a second lower portion, and defining a second interior chamber;
- a base disposed in the first interior chamber and below the aeration tank, the base having a length extending from the settling tank to the aeration tank and defining a communicative passageway between the first and second interior chambers;
- a plurality of brackets disposed in the clearance and connecting the aeration and settling tanks;
- a raw fluid inlet providing fluid communication with the second interior chamber;
- a fluid surface skimmer disposed in the clearance, the skimmer comprising an intake passage having an opening in fluid communication with the first interior chamber and first and second passageways connected by a flexible coupling, an outlet passage in communication with the intake passage and the second interior chamber, a collar disposed around the opening, at least one buoyant member attached to the collar, and a gas inlet disposed on the outlet passage;
- a gas supply line having a first portion extending into the second interior chamber and a second portion attached to the gas inlet of the skimmer; and
- a treated fluid outlet in communication with first interior chamber.

* * * * *